(12) United States Patent
Huang et al.

(10) Patent No.: US 7,736,017 B2
(45) Date of Patent: Jun. 15, 2010

(54) ILLUMINATION DEVICE AND DISPLAY WITH ILLUMINATION DEVICE

(75) Inventors: Michelle Kun Huang, Saline, MI (US); Julius Muschaweck, Gauting (DE); Francis Nguyen, Millbrae, CA (US); Felix Michel, Backnang (DE)

(73) Assignee: Osram Opto Semiconductors GmbH, Regensburg (DE)

( * ) Notice: Subject to any disclaimer, the term of this patent is extended or adjusted under 35 U.S.C. 154(b) by 48 days.

(21) Appl. No.: 11/956,646

(22) Filed: Dec. 14, 2007

(65) Prior Publication Data

US 2008/0192465 A1 Aug. 14, 2008

Related U.S. Application Data

(60) Provisional application No. 60/876,435, filed on Dec. 21, 2006.

(51) Int. Cl.
*F21V 9/00* (2006.01)
*F21V 7/04* (2006.01)

(52) U.S. Cl. .................................... 362/231; 362/613
(58) Field of Classification Search ................ 362/231, 362/612, 613
See application file for complete search history.

(56) References Cited

U.S. PATENT DOCUMENTS

2006/0245204 A1* 11/2006 Mizuta ...................... 362/559

* cited by examiner

*Primary Examiner*—John A Ward
(74) *Attorney, Agent, or Firm*—Fish & Richardson P.C.

(57) ABSTRACT

According to at least one embodiment of the invention an illumination device emitting light with an average color comprises a plurality of first light-emitting diodes (LEDs) emitting light with a first color and a plurality of second light-emitting diodes (LEDs) emitting light with a second color, wherein the average color is a superposition of the first and the second color.

5 Claims, 5 Drawing Sheets

1

ILLUMINATION DEVICE AND DISPLAY WITH ILLUMINATION DEVICE

CROSS-REFERENCE TO RELATED APPLICATION

Pursuant to 35 U.S.C. §119, this application claims the benefit of prior U.S. application No. 60/876,435, filed on Dec. 21, 2006. The contents of the aforementioned provisional patent application is hereby incorporated by reference in its entirety.

BACKGROUND

This disclosure relates to an illumination device and a display with an illumination device. More specifically, it relates to an illumination device comprising a plurality of light-emitting devices (LEDs) and a display with an illumination device with a plurality of LEDs.

SUMMARY

Disclosed herein is an illumination device emitting an average color comprises a plurality of first light-emitting diodes (LEDs) emitting light with a first color and a plurality of second light-emitting diodes (LEDs) emitting light with a second color, wherein the average color is a superposition of the first and the second color.

In at least one further embodiment the average color can be characterized as a single point in the CIE 1931 color space (in the following referred to as "color space"). Preferably the average color is represented by an average color point in the color space which located in the white color region. Furthermore, the first color and the second color may be characterized by points in the color space. Thereby, each of the plurality of first LEDs may be characterized by first points in the color space, respectively, which are located on a first side with respect to the average color point. Each of the plurality of second LEDs may be characterized by second points in the color space, respectively, which are located on a second side with respect to the average color point, wherein the second side is opposite to the first side with respect to the average color point. For example first points on the first side may have x and/or y coordinates which are smaller than the x and/or the y coordinates of the average color point, whereas second points on the second side may have x and/or y coordinates which are larger than the x and/or the y coordinates of the average color point.

In at least one preferred embodiment the first points are located in a first area and the second points are located in a second area in the color space. The first and second areas may be located on opposite sides with respect to the average color point. The first area and the second area may be equal in size and/or shape. The areas in the color space, for instance the first and second areas, may also be referred to as "bins".

The plurality of the first LEDs may have an average first color whereas the plurality of the second LEDs may have an average second color. The average first color and the average second color, when missed, may be close to or equal to the average color of the illumination device.

In at least one further embodiment the average color of the illumination device provides a white light impression for an observer. For white light impression, at least a first and a second wavelength are necessary, which can be superposed to achieve a white light impression for an observer. Preferably each of the first and the second LEDs emits light with a white color.

An LED may comprise a semiconductor chip that emits a first wavelength. Further, an LED, which may emit a first wavelength in the blue, may include a wavelength converter including a phosphor arranged in the light path of emitted light with the first wavelength. The wavelength converter may be able to convert at least a part of the light with the first wavelength to light with a second wavelength, wherein a superposition of the first and second wavelengths may result in a white light impression for an observer. Preferably the first wavelength may be a blue wavelength and the second wavelength may be a yellow wavelength. Preferably all first and second LEDs may emit light with substantially the same blue wavelength and substantially the same yellow wavelength.

The color of an LED may vary due to variation of the wavelength that is emitted by the LED as first wavelength and further due to variations in the composition and/or thickness of the wavelength converter and comprised phosphor. Therefore, the production LEDs may lead to a group of LEDs which have a color close to the average color of the illumination device and which may be characterized by a third color point in a third area in the color space, and a group of LEDs which have a color that is substantially different from the average color yielding the pluralities of first and second LEDs, respectively. LEDs which emit light with the third color may be referred to as third LEDs in the following.

Preferably, the average color of a plurality of illumination devices has a statistical distribution with a sufficiently small standard deviation from illumination device to illumination device. Furthermore, if used as a backlight for a display an illumination device should provide the same color impression at each point of the display screen. Any two displays that comprise illumination devices with LEDs as described above may preferably require having the same average color so they look identical when placed next to each other.

Depending on the relative intensities of light with blue and yellow wavelengths the white light impression may be different for different LEDs. For example, a first LED which has a higher relative intensity of light with a blue wavelength than a second LED may provide a more bluish-white light impression than the second LED. This may imply that the x and/or y coordinate of the color point of the first LED are smaller than the x and/or y coordinates of the color point of the second LEDs and each of the plurality of the second LEDs.

In at least one further embodiment the first color comprises a blue wavelength with a higher relative intensity than the average color and the second color comprises a yellow wavelength with a higher relative intensity than the average color. This may imply that a single first LED may provide a more bluish-white light impression than the illumination device as whole and a single second LED may provide a more yellowish-white light impression than the illumination device as whole.

In at least one further embodiment the illumination device comprises a carrier such as a printed-circuit board, a wafer, a substrate or the like where the plurality of first LEDs and the plurality of second LEDs may be mounted or arranged on.

In at least one further embodiment the first LEDs and the second LEDs are arranged in an alternating pattern. The first and second LEDs may be arranged in along a line wherein each LED of the plurality of first LEDs is arranged next to an LED of the plurality of second LEDs and vice versa.

Further, the first and second LEDs may be arranged in an array, wherein the first and second LEDs may be arranged in a chessboard-like pattern.

In at least one embodiment a display comprises an illumination device according to at least one embodiment as described above and an LCD matrix in the light path of the illumination device.

Furthermore, the display may comprise a light guide that guides the light emitted by the illumination device towards the LCD matrix.

The pluralities of first and second LEDs may be arranged at a first side of the light guide and the LCD matrix may be arranged at a second side of the light guide.

Further features, embodiments, and advantages are disclosed in the following in connection with the description of the exemplary embodiments in accordance with the figures.

DETAILED DESCRIPTION

FIG. 1 shows a simulation of the color distribution of a plurality of a set of 66 randomly chosen LEDs from a production line, each LED comprising a semiconductor chip that emits light with a first wavelength that is a blue wavelength and a wavelength converter that converts part of the light with the first wavelength to a second wavelength that is a yellow wavelength. The color points 101, 102, 1010 of the set of 66 LEDs in the color space are shown. The color points are first color points 101 located in a first area 11, named EL, second color points 102 in a second area 12, named GL, and third color points 1010 in a third area 10, named FL.

The first and second areas 11, 12 (or first and second bins) are situated on opposite sides with respect to the average color of the illumination device, represented by average color points 1020.

1000 samples of such sets of 66 LEDs were taken and for each of the 1000 samples the average color point 1020 was computed. The plurality of average colors 1020 exceeds ellipse 1030 which represents the maximum deviation of the desired average colors for each of the samples of sets of 66 LEDs to be suitable for an illumination device.

FIG. 2 shows a simulation as FIG. 1, but where the 66 LEDs of each set of the 1000 samples were chosen to emit light with a third color characterized by third color points 1010 which are close to ellipse 1030. All the average color points 1020 are located within ellipse 1030, indicating that each of the 1000 samples of sets of 66 LEDs would be suitable for an illumination device.

FIG. 3 shows a simulation, where the 66 LEDs of each set of the 1000 samples where chosen as 33 LEDs emitting light with a first color characterized by the first color points 101 and as 33 LEDs emitting light with a second color characterized by the second color points 102.

The average color point of each of the 1000 samples of sets of 66 LEDs, respectively, also is situated within ellipse 1030, indicating that also each of the 1000 samples of sets of 66 LEDs with pluralities of first and second LEDs would be suitable for an illumination device.

Figure 1:
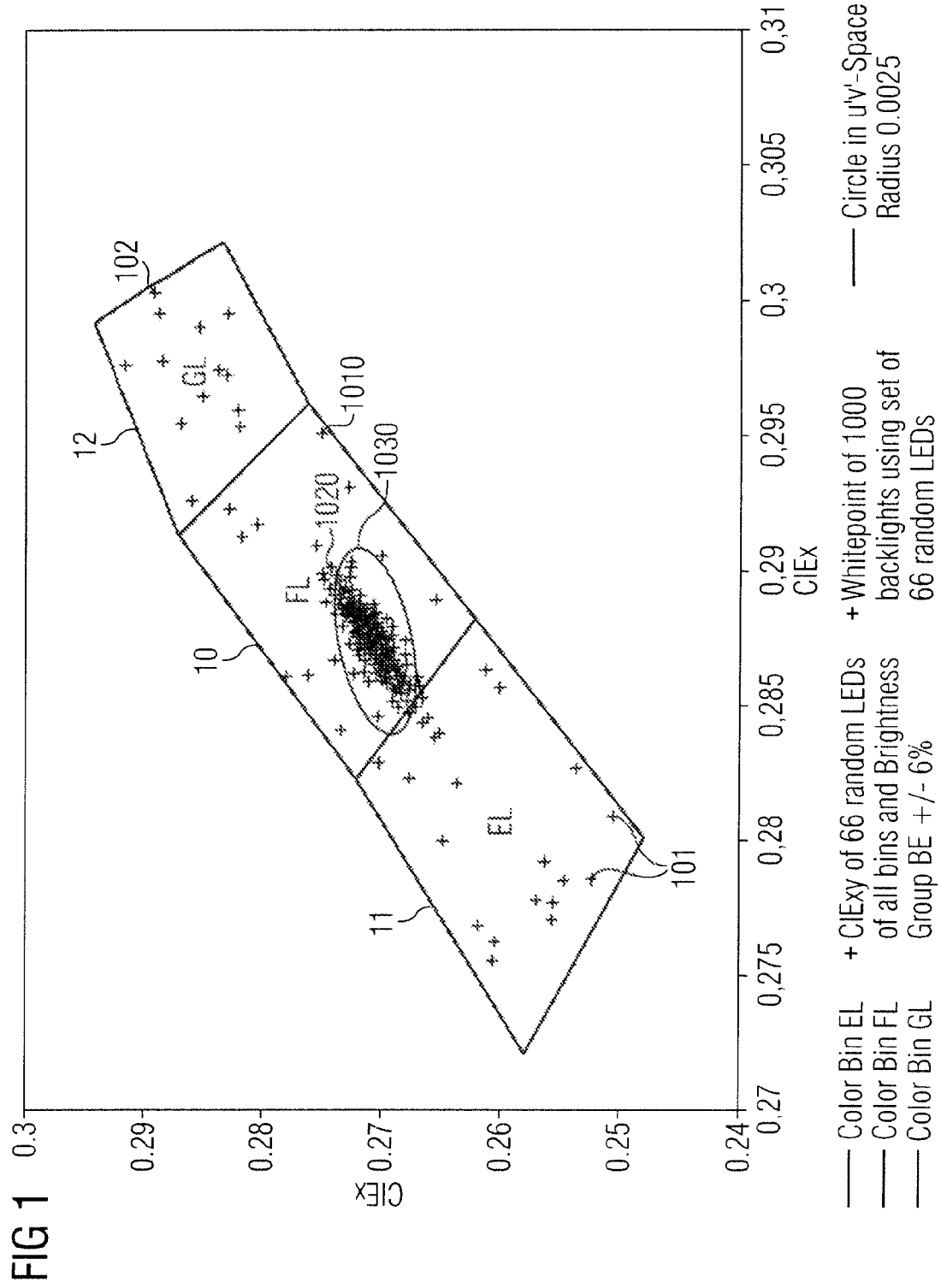
Figure 2:
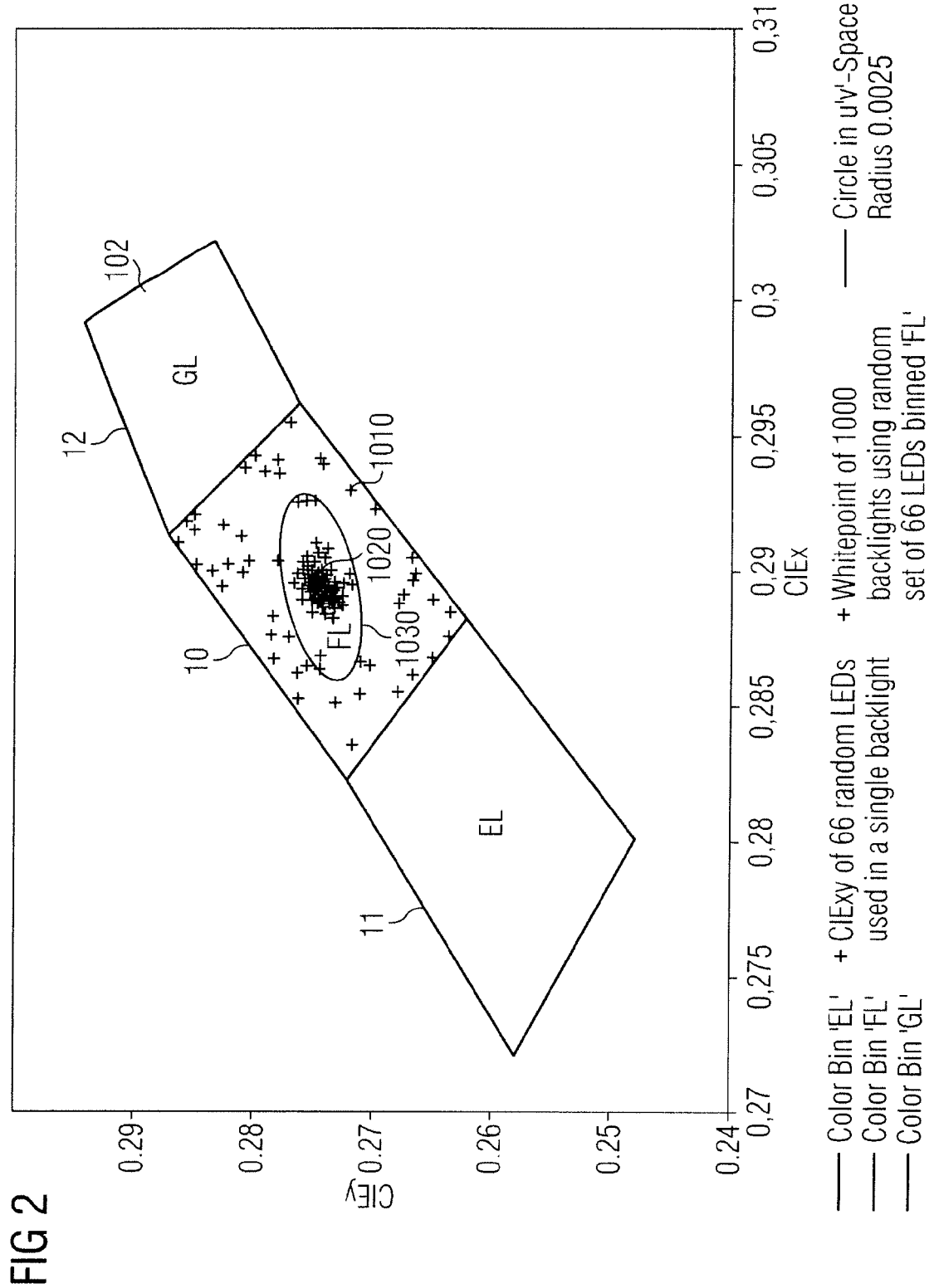
Figure 3:
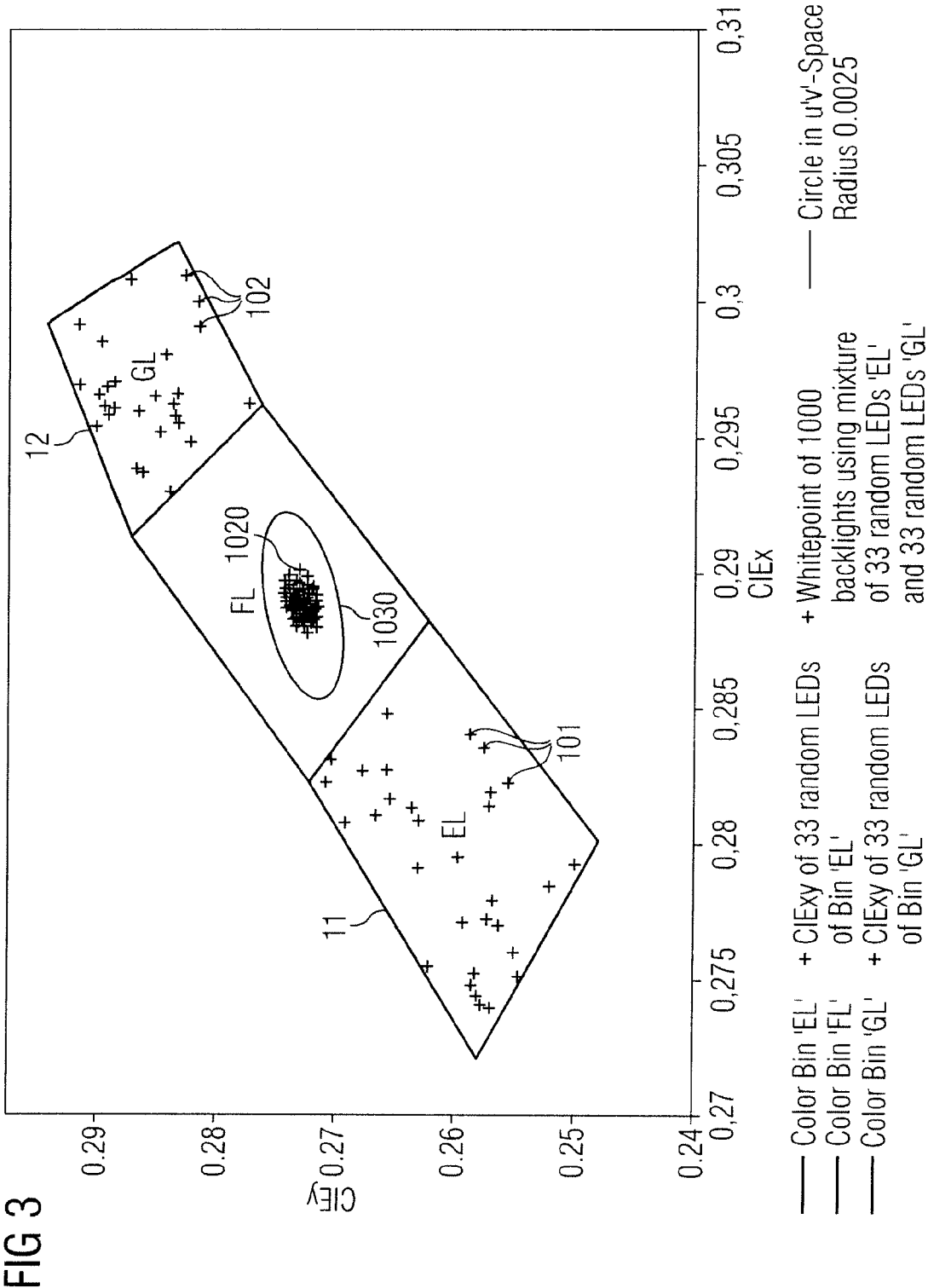
Figure 4A:
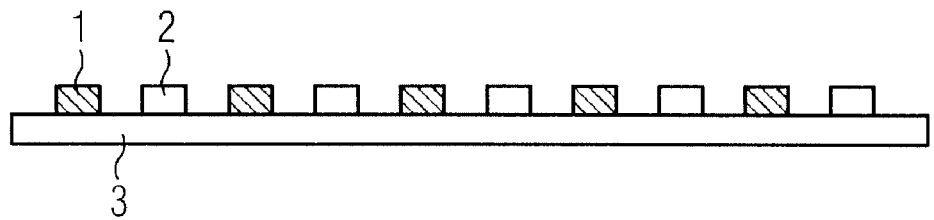
FIGS. 4A and 4B show a side view and a top view of an embodiment of an illumination device comprising substrate 3, which may be a printed-circuit board. On the substrate 3 a plurality of first LEDs 1 and a plurality of second LEDs 2 are arranged in an alternative pattern along a line.
Figure 4B:
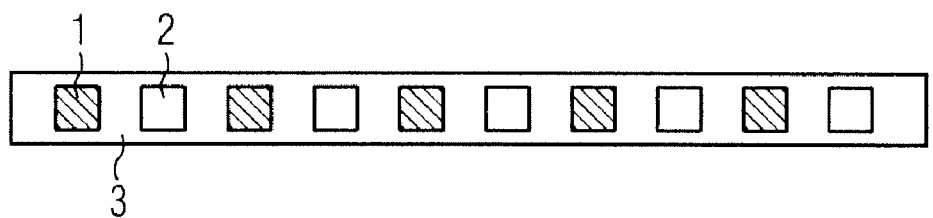
Figure 5:
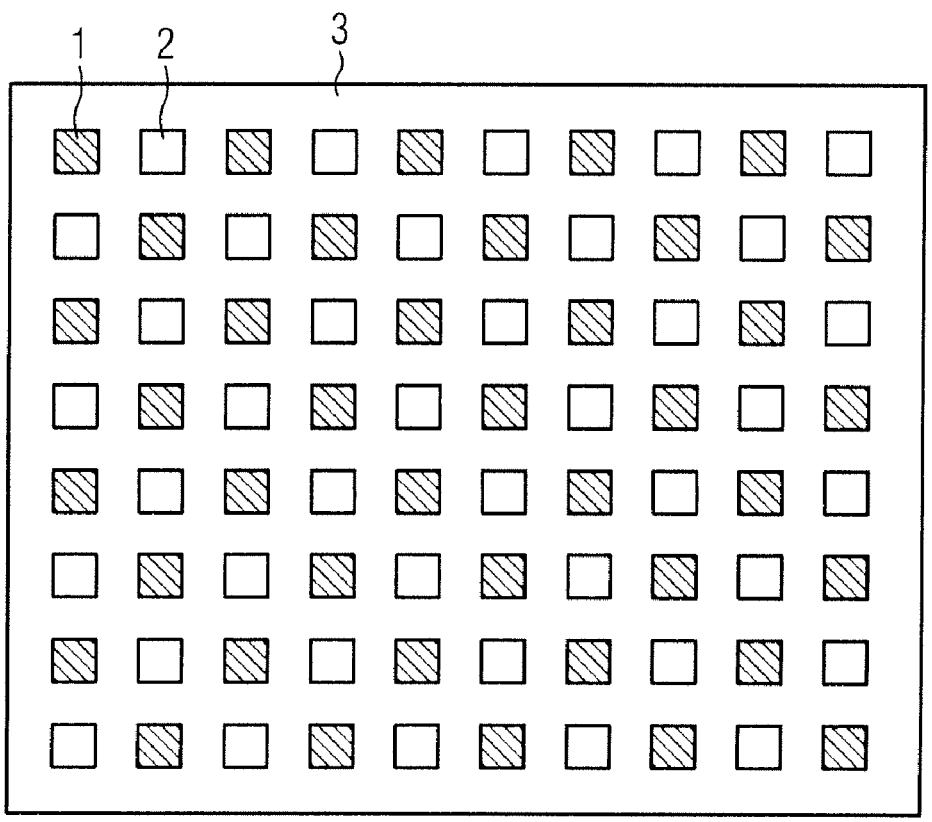
FIG. 5 shows a chessboard-like alternative pattern of pluralities of first and second LEDs 1, 2 on a substrate 3.
Figure 6:
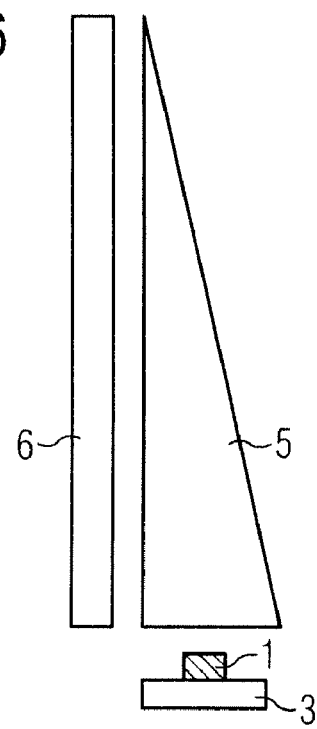
FIG. 6 shows an embodiment of a display comprising an illumination device as shown in FIGS. 4A and 4B. The light emitted by the plurality of first LEDs 1 and the plurality of second LEDs 2 is coupled into light guide 5 which guides the light towards an LCD matrix 6 which is therefore arranged is the light path of the illumination device.
Figure 7:
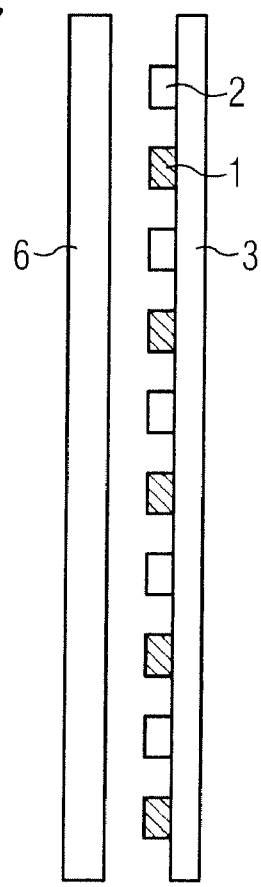
FIG. 7 shows a further embodiment of a display comprising an illumination device as shown in FIG. 5. The illumination device is a direct backlight unit of the display which directly illuminates LCD matrix 6.

Additionally to the first and second LEDs the illumination devices shown in the Figures may also comprise third LEDs.

The scope of the invention is not limited to the exemplary embodiments described herein. The invention is embodied in any novel feature and any novel combination of features which include any combination of features which are disclosed herein as well as stated in the claims, even if the novel feature or the combination of features are not explicitly stated in the claims or in the embodiments.

What is claimed is:

1. An illumination device emitting light with an average color, comprising
    a plurality of first light-emitting diodes (LEDs) emitting light with a first color and a plurality of second light-emitting diodes (LEDs) emitting light with a second color, wherein the average color is a superposition of the first and the second color,
    the first color providing a bluish-white color impression and the second color providing a yellowish-white color impression
    wherein each of the plurality of first LEDs is characterized by a respective first point in the color space, each respective first point in the color space located on a first side with respect to an average color point,
    each of the plurality of second LEDs is characterized by a respective second point in the color space, each respective second point in the color space located on a second side with respect to the average color point,
    the second side is opposite the first side with respect to the average color point,
    the plurality of the first LEDs has an average first color,
    the plurality of the second LEDs has an average second color, and
    the average first color and the average second color, when mixed, are close to or equal to the average color of the illumination device.

2. The illumination device according to claim 1, wherein the first LEDs and the second LEDs are arranged in an alternating pattern.

3. The illumination device according to claim 2, wherein the alternating pattern is a line shaped pattern or a chessboard-like pattern.

4. The illumination device according to claim 1, wherein the first color comprises a blue wavelength with a higher relative intensity than the average color and the second color comprises a yellow wavelength with a higher relative intensity than the average color.

5. A display, comprising
    an illumination device according to claim 1, and
    an LCD matrix in the light path of the illumination device.

* * * * *